United States Patent [19]
Do et al.

[11] Patent Number: 5,999,040
[45] Date of Patent: Dec. 7, 1999

[54] VOLTAGE BOOSTER CIRCUIT WITH CONTROLLED NUMBER OF STAGES

[75] Inventors: Tien-Dung Do, Fuveau; François Guette, Montbonnot St Martin; Mathieu Pierre Gabriel Lisart, Aix-en-Provence, all of France

[73] Assignee: STMicroelectronics S.A., Gentilly, France

[21] Appl. No.: 09/044,457

[22] Filed: Mar. 19, 1998

[30] Foreign Application Priority Data

Mar. 19, 1997 [FR] France .................................... 97 03510

[51] Int. Cl.$^6$ ........................................................ G05F 1/10
[52] U.S. Cl. ........................... 327/536; 327/534; 327/589; 327/590; 363/59; 363/60
[58] Field of Search ............................ 307/110; 327/536, 327/534, 589, 590, 535, 537; 363/59, 60

[56] References Cited

U.S. PATENT DOCUMENTS

| | | | |
|---|---|---|---|
| 4,583,157 | 4/1986 | Kirsch et al. | 363/60 |
| 5,140,182 | 8/1992 | Ichimura | 327/536 |
| 5,179,289 | 1/1993 | Sridharan | 307/110 |
| 5,276,646 | 1/1994 | Kim et al. | 365/189 |
| 5,384,749 | 1/1995 | Lisart et al. | 365/230 |
| 5,467,053 | 11/1995 | Wuidart et al. | 327/551 |
| 5,469,100 | 11/1995 | Wuidart et al. | 327/262 |
| 5,491,623 | 2/1996 | Jansen | 363/60 |
| 5,574,634 | 11/1996 | Parlour et al. | 363/59 |
| 5,635,776 | 6/1997 | Imi | 307/110 |
| 5,666,077 | 9/1997 | Fournel et al. | 327/80 |
| 5,734,290 | 3/1998 | Chang et al. | 327/536 |
| 5,798,915 | 8/1998 | Thomsen | 363/60 |

FOREIGN PATENT DOCUMENTS

| | | |
|---|---|---|
| 0350462 | 1/1990 | European Pat. Off. . |
| 0591022B1 | 9/1993 | European Pat. Off. . |
| 2724468 | 3/1996 | France . |
| 02197264 | 7/1990 | Japan . |
| 2296605 | 7/1996 | United Kingdom . |

*Primary Examiner*—Terry D. Cunningham
*Assistant Examiner*—An T. Luu
*Attorney, Agent, or Firm*—Gunster, Yoakley, Valdes-Fauli & Stewart, P.A.

[57] ABSTRACT

A voltage booster circuit including an input for receiving a supply voltage, a plurality of stages for producing an output voltage from the supply voltage by the transfer of charges between at least two of the plurality of stages, and circuit for coupling and decoupling stages to vary the number of stages operatively connected together. A method for producing an output voltage from a supply voltage by using a voltage booster circuit, the circuit includes an input for receiving the supply voltage, a plurality of stages, and a selection switch for the selective isolation of the stages or for the selective connection of the stage. The method includes the following steps: starting the circuit; comparing the value of the output voltage with a decrementation threshold; and decreasing the number of stages which are connected if the decrementation threshold is reached by the value of the output voltage.

40 Claims, 11 Drawing Sheets

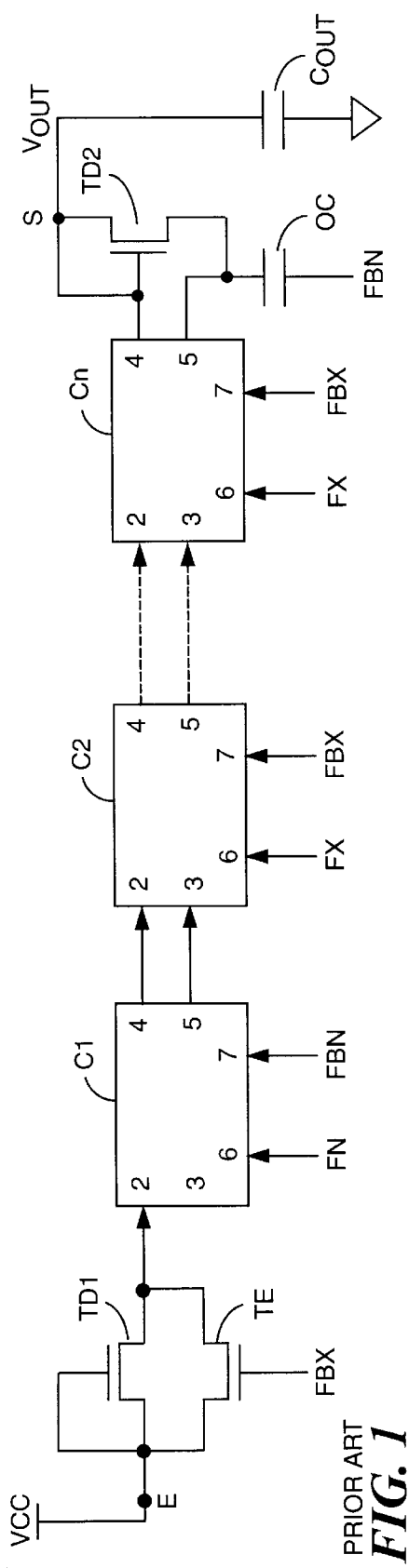
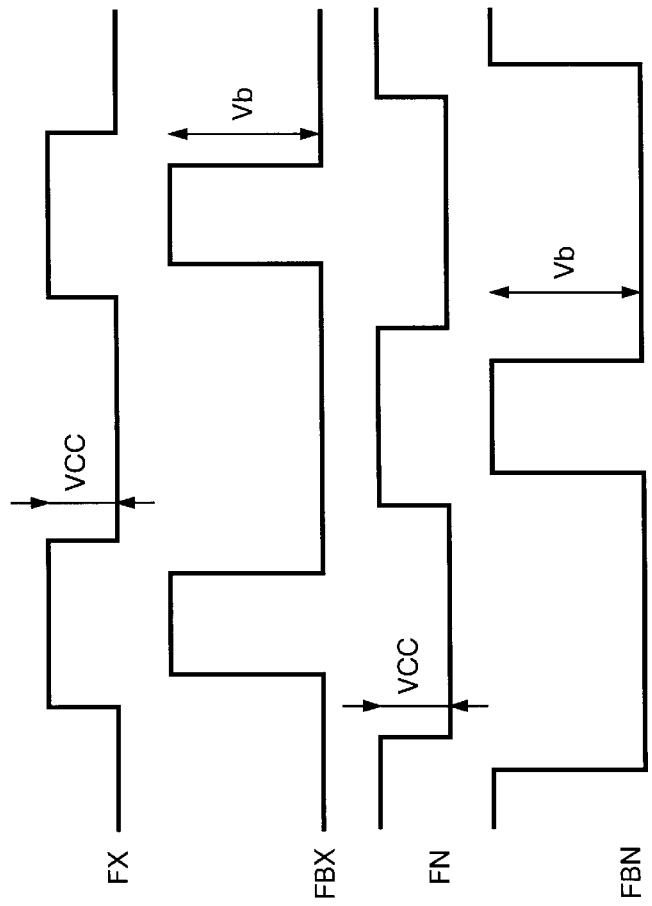
PRIOR ART
FIG. 1
FIG. 3a
FIG. 3b
FIG. 3c
FIG. 3d

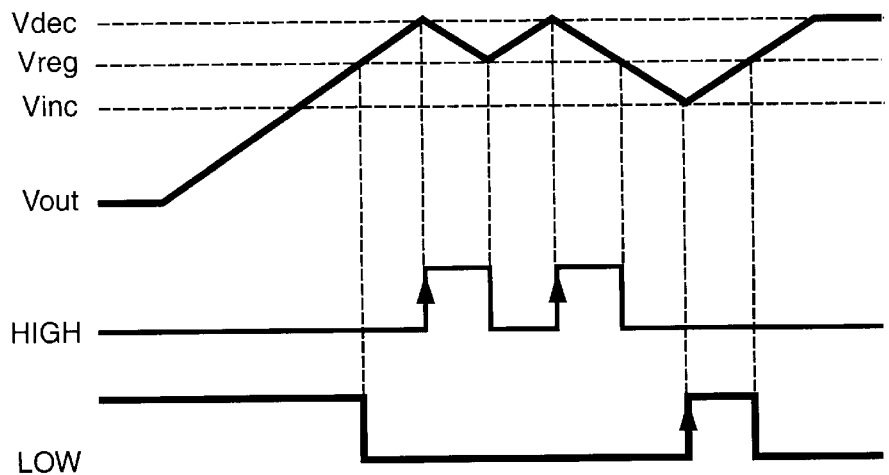
FIG. 11a
FIG. 11b
FIG. 11c
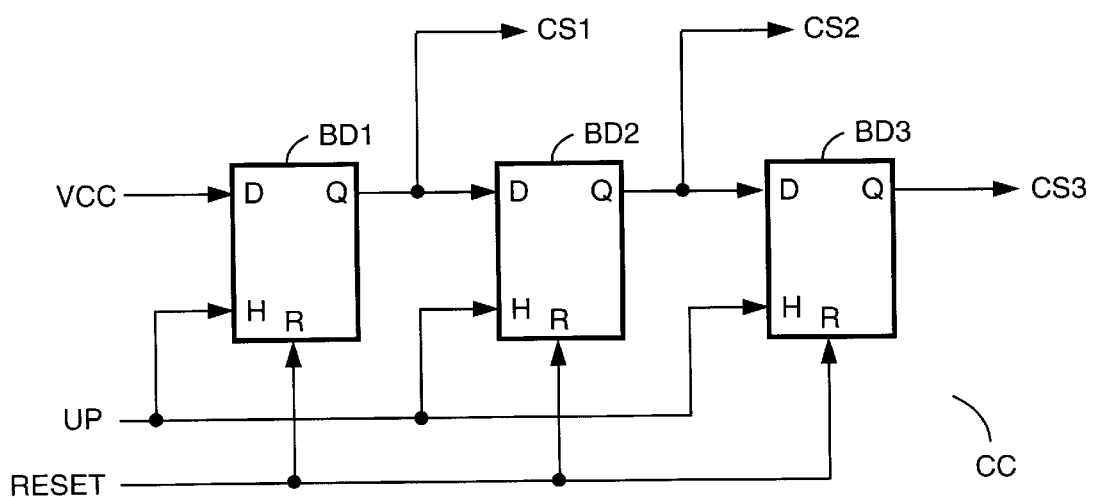
FIG. 12

VOLTAGE BOOSTER CIRCUIT WITH CONTROLLED NUMBER OF STAGES

BACKGROUND OF THE INVENTION

1. Field of the Invention

The invention relates to a charge pump type of voltage booster circuit with a controlled number of stages. It is useful in any integrated circuit in which it is sought to produce a DC voltage of high value from a supply voltage. The invention is useful for example in the field of circuits comprising an electrically programmable memory.

A charge pump type of voltage booster circuit is used to produce a voltage within a circuit from a supply voltage received from outside, by transferring charges between consecutive capacitors so that the voltage produced (positive or negative) is greater in terms of absolute value than the supply voltage.

This type of circuit is used chiefly to supply capacitive circuits. For example, circuits of this kind are used in the field of electrically programmable volatile memories using metal-oxide-semiconductor ("MOS") type floating-gate transistors as storage cells, to produce programming and/or erasure voltages. The programming and erasure of these memories indeed requires voltage levels (of about 10 to 20 volts for example) far greater than that of the supply voltage generally used in integrated circuits (typically in the range of 3 to 5 volts).

2. Description of the Prior Art

FIG. 1 shows a known circuit, of the charge pump type (hereinafter called a charge pump) used to supply a capacitive type of circuit with a positive output voltage Vout produced from a supply voltage VCC. A circuit of this kind is described in the European patent 0 591 022 B1 owned by SGS-THOMSON Microelectronics S.A.

The schematic diagram of the pump is shown in FIG. 1. It has a set of n (with n as an integer) elementary stages C1 to Cn whose structure is illustrated in FIG. 2. The stages are series-connected between an input E and an output S and receive driving signals FX, FBX, FN, FBN called phases (illustrated in the timing diagrams 3a to 3d). The capacitive circuit is illustrated schematically in FIG. 1 by means of an equivalent capacitance Cout connected to the output S of the pump. It will be noted that the capacitance Cout could be the capacitance of an output capacitor that is physically present and integrated with the charge pump. The input E receives the voltage VCC.

An elementary stage 1, as shown in FIG. 2, comprises:

- a first input 2 and a second input 3,
- a first output 4 and a second output 5,
- two synchronization inputs 6 and 7 to receive two clock signals CKL1 and CKL2,
- a first capacitor 8 connected between the inputs 2 and 6,
- a second capacitor 9 connected between the inputs 3 and 7,
- a first N channel MOS type transistor 10, its drain being connected to the input 2, its source being connected to the input 3 and its control gate being connected to the output 5, and
- a second N channel MOS type transistor 11, its drain being connected to the output 4, its source being connected to the input 2 and its control gate being connected to the input 3.

In the charge pump shown in FIG. 1, the stages C2 to Cn have their inputs 2 and 3 connected respectively to the outputs 4 and 5 of the previous stages C1 to Cn−1. The input 2 of the first stage C1 is connected to the input E by means of an N channel MOS type transistor TD1 mounted as a diode and an N channel MOS type transistor TE. The control gate of the transistor TE receives one of the phases (FBX in the example shown) and makes it possible for VCC to be supplied directly to the input 2 of the stage C1. The input 3 of the first stage C1 is not connected. The output 4 of the last stage Cn is connected to the output S. Its output 5 is connected to its output 4 by means of a N channel MOS type transistor TD2 mounted as a diode. This output 5 is connected furthermore to the first pole of a capacitor OC whose second pole receives one of the phases (FBN in the example shown).

The charge pump illustrated in FIG. 1 is driven by two pairs of phases: FN and FX on the one hand switching between two voltage levels, 0 volts and VCC, these phases being complementary but not overlapping in the high stage; FBN and FBX on the other hand respectively synchronized with the phase FN and FX but switching between two different voltage levels, 0 volts and Vb, where Vb is a voltage level greater by at least Vt (Vt being the threshold voltage, in taking account of the substrate effect, of the transistors 11 of the stages) than the voltage that must be let through by the transistors 11 of the stages of the charge pump.

The stages receive the phases FN and FBN or the phases FX and FBX at their inputs 6 and 7, two consecutive stages receiving two distinct pairs of phases. The transistor TE (and respectively the second pole of the capacitor OC) receives the phase FBX or the phase FBN depending on whether the first stage (and the last stage respectively) receives the phase FBN or the phase FBX.

With n series-connected stages, it is possible in theory to produce an output voltage Vout=(n+1)*VCC available at the output 4 of the last stage Cn by successive transfers of charges into the stages.

In practice, the value of (n+1)*VCC is reached only asymptotically at the output of the charge pump, i.e., the output voltage Vout increases at a constantly lower speed as and when charges are transferred from one stage to the other. It therefore often becomes necessary, in order to reduce the build-up time of the output voltage produced, to use a number of stages greater than the theoretically sufficient number. As it is generally preferred to produce an output voltage whose value is fixed, it becomes necessary to limit the voltage produced at the output of the pump to this value. This limiting can be done by stopping the transfer of the charges once the desired value is achieved, for example by dictating a constant potential at the level of the phases. It may also be done through the consumption, at the output of the charge pump, of the surplus charges produced. Typically, this consumption is obtained by means of a highly resistive arm whose conduction threshold (which of course corresponds to the desired value) is determined by the sum of the threshold voltages of series-connected diodes. This approach is generally not used as it induces a greater consumption of current. Indeed, the charge pump then works continuously.

Furthermore, it would be valuable to use a large number of stages if we consider the maximum current that can be given at the output of the pump for a given value of output voltage.

Let us consider for example the circuit of FIG. 4. It sets up a charge pump model supplying a resistive load RL. The voltage at the terminals of the load RL is Vout and it is crossed by a current IL. The charge pump is represented by a voltage source giving a no-load voltage Vlim and having an output resistance Rout. For a charge pump with n stages, we have Vlim=(n+1)*VCC. It can be shown that the current IL given is proportional to the operating frequency of the charge pump and to the value of the pumping capacitors.

FIG. 5 illustrates the value of the output voltage Vout as a function of the current IL for two pumps with a different number of stages. The output voltage of a charge pump with p stages is referenced V(p) and the output voltage of a charge pump with q stages is referenced V(q) assuming that q<p. With q stages, we have Vlim=Vlq=(q+1)*VCC and with p stages we have Vlim=Vlp=(p+1)*VCC>Vlq.

If we assume a voltage level Vs smaller than Vlq, it is observed that the current Imp given by the charge pump with p stages is greater than the maximum current lmq given by the charge pump with q stages, and that this is so inasmuch as Vout is greater than VCC If it is desired to supply a major current, it is therefore necessary to use a large number of stages. On the contrary, it is noted that for a given variation in current, the voltage drop for the charge pump with q stages is smaller than the voltage drop for the charge pump with p stages. In other words, in dynamic operating mode, it is useful to use a smaller number of stages. Indeed, it can be shown that the build-up time of the output voltage is proportional to the square of the number of pumping stages.

A present trend is to produce circuits working for wide ranges of supply voltage (which can be supplied for example without distinction with 3 volts or 5 volts). Now, if a circuit of this kind necessitates the use of a charge pump, the value of the output voltage to be produced is generally dictated by the physical parameters of the circuit; namely independently of the value of the supply voltage. In such a case, it is necessary to provide for a number of stages corresponding to the least favorable scenario; namely in practice a number of stages that is sufficient if the value of the supply voltage is the minimum. By placing a regulation circuit (also commonly known as a regulating circuit or a regulator circuit) at the output of the charge pump, the value of the voltage produced is limited if the supply voltage is greater than the minimum value. This limit makes it possible not to have any excessive variation of the voltage produced, especially an excessive output voltage when the supply voltage is high, which could give rise to premature aging or malfunctioning in the circuits supplied by the charge pump.

The definition of a charge pump capable of working for a wide range of supply voltages has drawbacks related to the need to set the number of stages as a function of the minimum supply voltage.

The output impedance of the pump is substantially constant whatever the supply voltage. In practice, this impedance is conversely proportional to the value of the capacitances of the stages and to the working frequency (namely, to the frequency of the phases), and proportional to the number of stages. Now it may be sought to minimize this output impedance. As stated, charge pumps are generally used to supply voltage to the capacitive circuits. The ability to reach the desired output voltage swiftly is therefore of vital importance. A penalty is therefore suffered in the favorable cases (with high supply voltage) where it would be sufficient to have a small number of stages, since the time constant at the output of the charge pump increases with the number of stages. One approach is to provide for a low working frequency. However, in this case, the maximum current diminishes and the build-up time of the output voltage increases. It is also possible to plan to reduce the value of the pumping capacitors. In this case, the maximum current available is also reduced. In practice, it becomes necessary to make choices with respect to the application envisaged, and it is not easy to set the size of a charge pump as the number of parameters to be taken into account is great and the impact of the modifications of a parameter induces effects that are both positive and negative depending on the characteristic studied. Accordingly, there is a need for a voltage booster circuit which overcomes these problems.

SUMMARY OF THE INVENTION

According to one aspect of the invention, there is provided a voltage booster circuit comprising an input for receiving a supply voltage, a plurality of stages for producing an output voltage from the supply voltage by the transfer of charges between at least two of the plurality of stages, and connection means for coupling and decoupling stages to vary the number of stages operatively connected together.

According to another aspect of the invention, there is provided a method for producing an output voltage from a supply voltage by using a voltage booster circuit, the circuit comprising an input for receiving the supply voltage, a plurality of stages, and selection switch means for the selective isolation of the stages or for the selective connection of the stages, the method comprising the following steps: starting the circuit; comparing the value of the output voltage with a decrementation threshold; and decreasing the number of stages which are connected if the decrementation threshold is reached by the value of the output voltage.

BRIEF DESCRIPTION OF THE DRAWINGS

The invention will be understood more clearly and other advantages and particular features will appear from the following detailed description of an exemplary embodiment of the invention illustrated by the appended drawings, of which:

FIG. 1 gives a schematic view of a prior art voltage booster circuit of the charge pump type.

FIGS. 3a to 3d show the timing diagrams of driving signals used for the operation of the voltage booster circuit of FIG. 1.

FIGS. 11a to 11c show timing diagrams of signals.

FIG. 12 shows a first exemplary control circuit.

DETAILED DESCRIPTION OF AN EMBODIMENT

It is an aim of the invention is to propose a charge pump that is optimized from the viewpoint of the output impedance, without any deterioration in the other operating parameters, that is capable of working on a wide range of supply voltages. To do this, the invention proposes a charge pump structure for which the number of stages is variable as a function of the supply voltage.

The invention makes use of all the stages of the output pump when the system is started up. As a result, it is certain that the output voltage value desired will be reached even if the supply voltage is the minimum. Furthermore, as we have seen, there is then a higher maximum current. If the supply voltage is high enough to provide for the use of a smaller number of stages, the number of stages of the charge pump is reduced. This makes it possible, firstly, to diminish the output impedance of this charge pump and, secondly, to minimize the variations of the output voltage as a function of the output current. Furthermore, this makes it possible to minimize the problems of substrate effect that arise in the pumping stages, these problems being all the greater as the number of stages is high. Thus, on the whole, more efficient characteristics of operation are obtained for high supply voltages, while at the same time it is possible to operate low supply voltages.

Thus the invention proposes a charge pump type of voltage booster circuit comprising series-connected stages for the production, by transfer of charges between the stages, of an output voltage from a supply voltage. The circuit comprises means to reduce or increase the number of stages connected as a function of the value of the voltage produced, so that the number of stages connected is adapted to the number of stages necessary to attain a specified output voltage value, given the value of the supply voltage.

Figure 6:
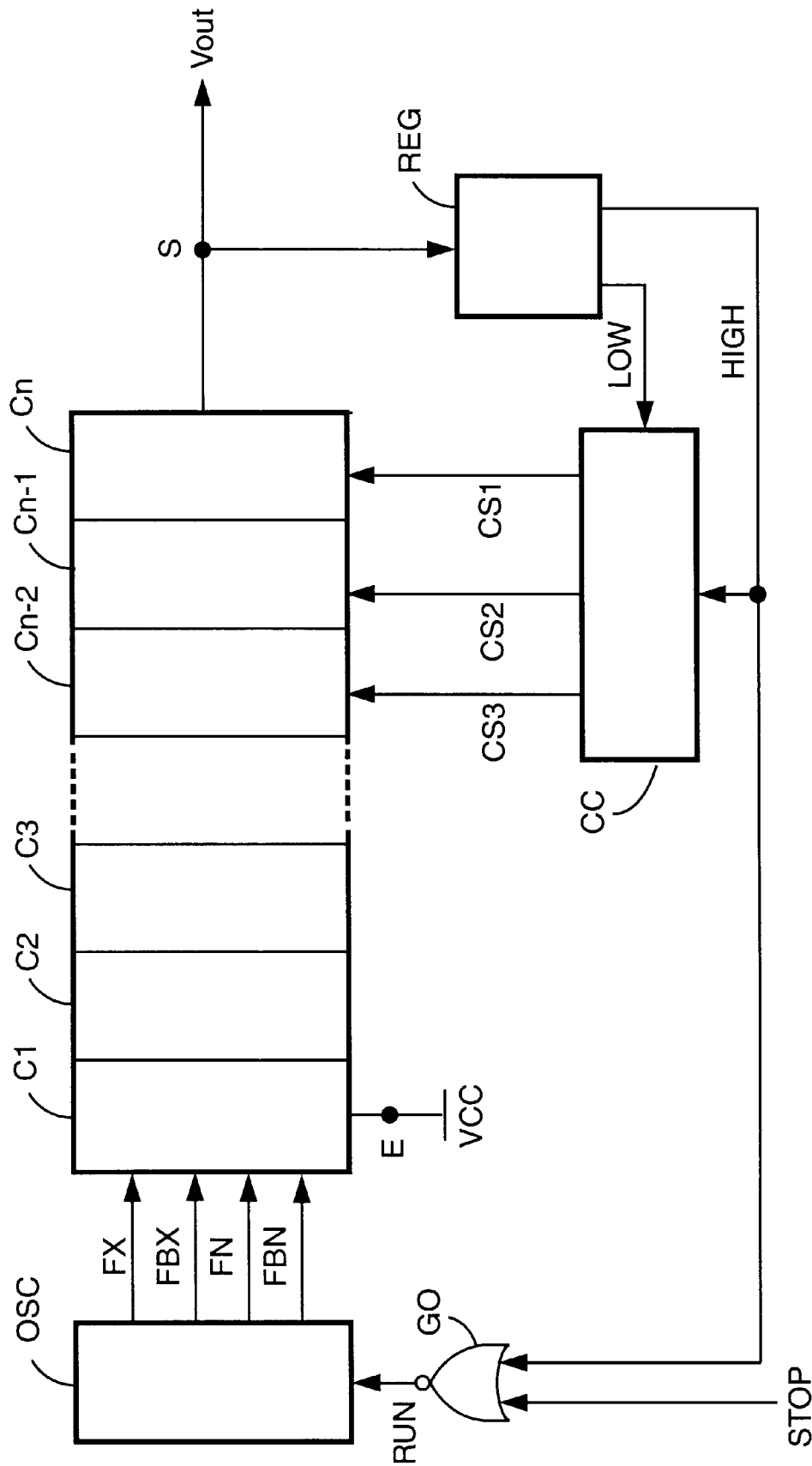
FIG. 6 gives a schematic view of a voltage booster circuit of the charge pump type made according to the invention.

FIG. 6 gives a schematic view of a voltage booster circuit of the charge pump type (hereinafter called a charge pump) made according to the invention. It can be used to produce an output voltage Vout from a supply voltage VCC in such a way that the voltage Vout produced is greater in terms of absolute value than the value of the voltage VCC.

Hereinafter in the description, taking a binary logic signal X into account, the notation /X will designate the logic signal complementary to the signal X.

The charge pump of FIG. 6 comprises, in a manner similar to the prior art charge pump shown in FIG. 1, a set of n elementary series-connected stages C1 to Cn. The charge pump produces the output voltage Vout at the output S.

The working of the charge pump is driven by control signals such as the phases shown in FIGS. 3a to 3d. These phases are produced by an oscillator OSC depending on the state of a logic control signal RUN which permits or prohibits the working of the oscillator. For example, the operation is permitted if RUN is in the high state. If not, the operation is prohibited. In the latter case, typically, the phases will be kept at a fixed potential. As will be seen hereinafter, the charge pump according to the invention is of the type for which it is possible to stop[ the transfer of charges when a given voltage level is reached at output.

The signal RUN is, for example, produced by a two-input NOR type logic gate G0 receiving, at a first input, a control logic signal STOP by which the oscillator can be started or stopped. The structure of the oscillator OSC shall not be described here as a circuit of this kind is well known to those skilled in the art. The signal STOP will be given for example by a control circuit that is not shown when the output voltage is to be produced. A circuit of this kind, if we consider for example a memory, will be typically sensitive to the programming and/or erasure control signals.

The charge pump furthermore comprises a regulation circuit REG and a control circuit CC. The regulation circuit REG provides a first control logic signal HIGH and a second control logic signal LOW.

The control signal HIGH, called a decrementation signal, is given to a second input of the gate G0 and to the control circuit CC. The control signal LOW, called an incrementation signal, is given to the control circuit CC.

The control circuit CC gives control signals CS1, CS2 and CS3 to the last three stages Cn, Cn−1 and Cn−2 of the charge pump (it is assumed here of course that n is greater than 3).

The decrementation control signal HIGH is used to control the activation or stopping of the transfer of charges from one stage to the next one when the signal STOP is also in the low state.

Since the gate G0 is a NOR type gate, it is assumed here that there is a transfer of charges if the signal HIGH is in the low state and that this transfer is stopped if it is in the high state. Indeed, assuming that the signal STOP is in the low state, the signal RUN is in a state opposite to that of the signal HIGH. It is possible of course to choose to use another type of gate and modify the polarities of the logic signals accordingly.

As shall be seen hereinafter, the decrementation control signal HIGH is also used to activate a reduction in the number of stages of the charge pump.

The incrementation control signal LOW is, for its part, used to control an increase in the number of stages of the charge pump.

The invention proposes to modify the total number of series-connected stages as a function of the values of the supply voltage VCC and the output voltage Vout so as to optimize the output impedance by minimizing the number of stages when the supply voltage is high.

Hereinafter in the description, it is assumed that it is possible to isolate the last three stages Cn−2, Cn−1 and Cn of the charge pump or to series-connect them with the other stages. It goes without saying that the invention can be extended to a greater or smaller number of stages. It will be assumed furthermore that the output voltage Vout produced by the charge pump is positive. Those skilled in the art will extend the invention without difficulty to the case of a charge pump delivering a negative voltage.

1—Structure of the Last Stages of the Charge Pump

Figure 7:
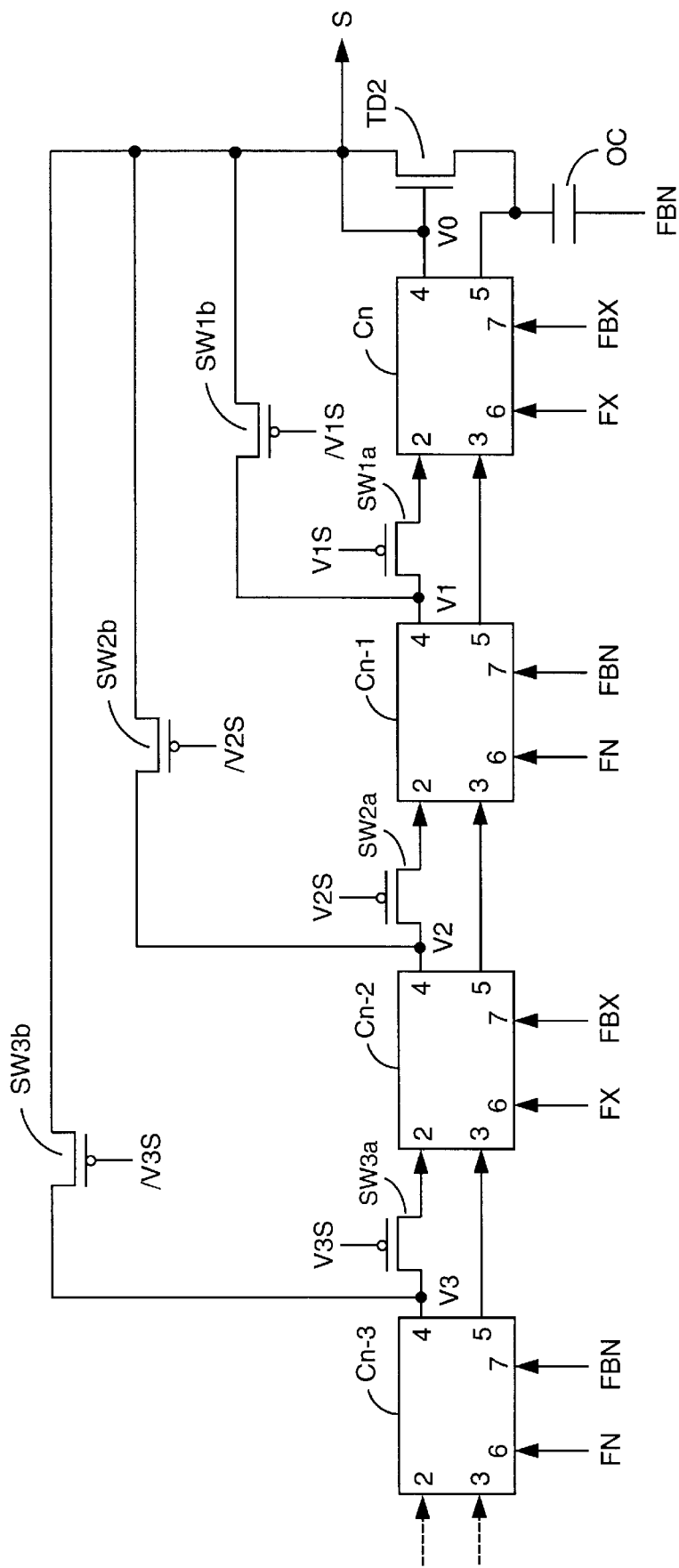
FIG. 7 shows a part of the circuit of FIG. 6.

FIG. 7 gives a detailed view of the last stages of the charge pump of FIG.

Figure 2:
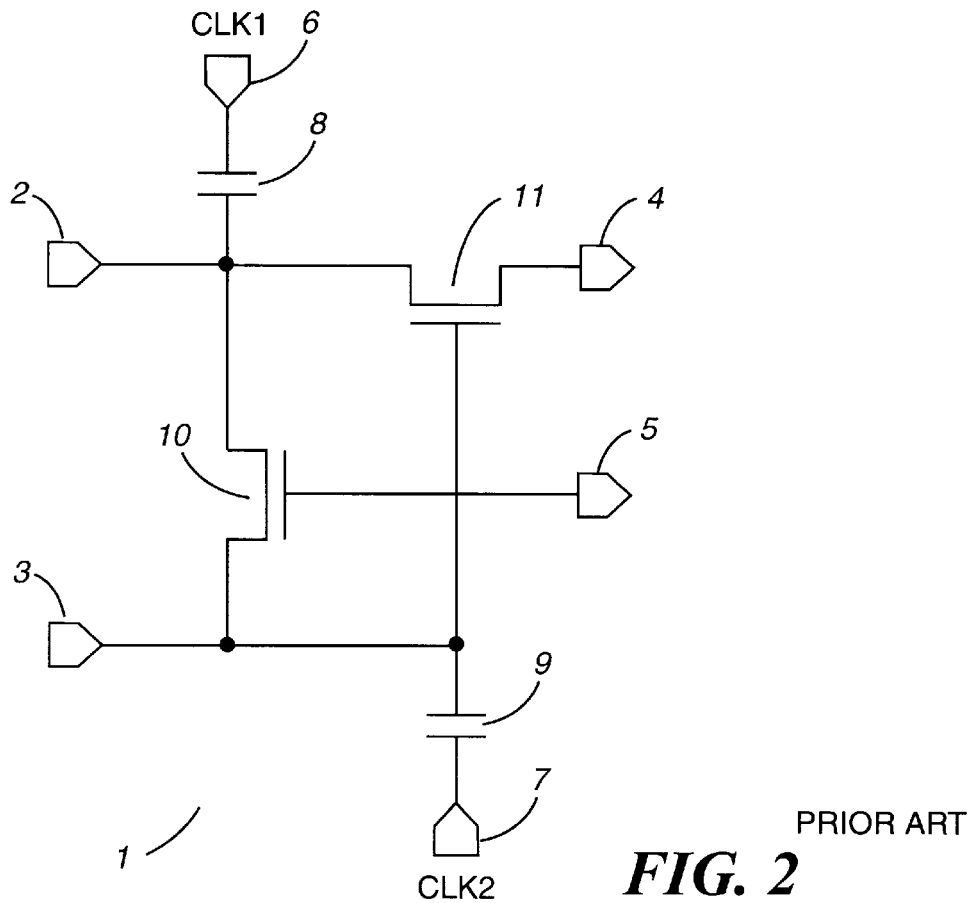
FIG. 2 illustrates the structure of an elementary stage of the circuit of FIG. 1.
Figure 4:
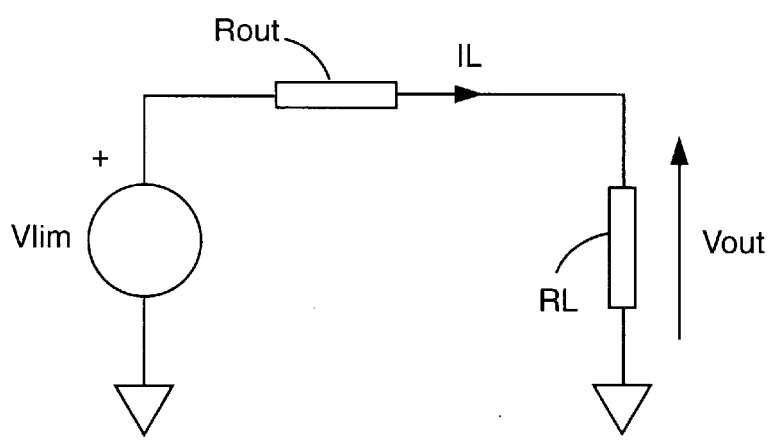
FIG. 4 is a diagram representing the supply of a resistive load by a charge pump.
Figure 5:
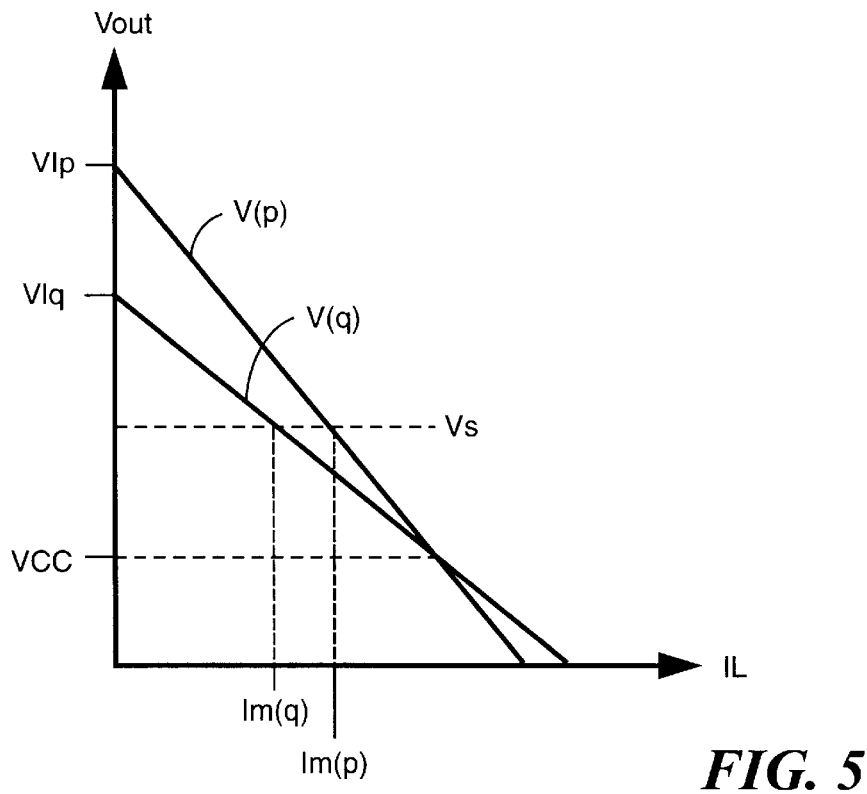
FIG. 5 gives an illustration, for charge pumps with different numbers of stages, of the development of the output voltage as a function of the load current.

This FIG. 7 shows the last four stages Cn−3 to Cn of the charge pump. These stages will have, for example, a structure similar to that of the prior art stage shown in FIG. 2.

The voltages present at the outputs 4 of the stages Cn−3, Cn−2, Cn−1 and Cn are respectively referenced V3, V2, V1 and V0.

The outputs 4 of the stages Cn−3, Cn−2 and Cn−1 are respectively connected to the input 2 of the stage Cn−2, the input 2 of the stage Cn−1 and the input 2 of the stage Cn by means of first selection switch circuits SW3a, SW2a, and SW1a.

In the example shown, these first selection switch circuits are P channel MOS type transistors respectively bearing the references SW3a, SW2a and SW1a. These transistors make it possible to connect the output 4 of an input stage 2 to the next stage or to isolate it from this next stage as a function of switching control signals (respectively referenced V3S, V2S and V1S) received at their control gate. Thus, the transistor SW3a is used to isolate the stages Cn−3 and Cn−2, the transistor SW2a is used to isolate the stages Cn−2 and Cn−1 and the transistor SW1 a is used to isolate the stages Cn−i and Cn. It is therefore by these transistors that the number of stages of the charge pump will be modified. Naturally, it is possible to choose to use other types of transistors to obtain the first switching circuit. What is important is that it should be possible to isolate the stages from one another.

The outputs 4 of the stages Cn−3, Cn−2 and Cn−1 are furthermore connected to the output S of the charge pump by means of second selection switch circuits SW3b, SW2b, and SW1b.

In the example shown, these second selection switch circuits are P channel MOS type transistors respectively bearing the references SW3b, SW2b and SW1b. These transistors make it possible for the outputs 4 of the stages Cn−3, Cn−2 and Cn−1 to be respectively connected to or isolated from the output S as a function of the switching control signals /V3S, /V2S and /V1S received at their control gate. Thus, the transistor SW3B makes it possible for the output 4 of the stage Cn−3 to be isolated from the output S, the transistor SW2b makes it possible for the output 4 of the stage Cn−2 to be isolated from the output S, and the transistor SW1b makes it possible for the output 4 of the stage Cn−1 to be isolated from the output S. These transistors make it possible for the output of the charge pump to be connected to the output of the last stage which is series-connected to the first stage of the pump (in other words to the output of the last stage that is not isolated from the other stages when the number of stages used is smaller than the maximum number of stages).

Since the switching control signals of the first and second selection switch circuits, V3S, /V3S, V2S, /V2S, V1S, and /V1S, placed at the output of the stages Cn−3, Cn−2 and Cn−1 are complementary, the output 4 of these stages Cn−3, Cn−2 and Cn−1 is connected either to the input 2 of the next stage or to the output S.

2—Production of Switching Control Signals

The complementary switching control signals ViS and /ViS (with "i" as an integer equal here to 1, 2, or 3) are produced, for example, by potential translator circuits CBi themselves driven by selection control signals. These circuits are used for the production of high-potential control logic signals from lower-potential control logic signals. The use of such circuits is justified by the fact that it is impossible to turn the P channel transistors SW1a, SW1b, SW2a, SW2b, SW3a and SW3B off by applying the potential VCC to their control gate.

Figure 8:
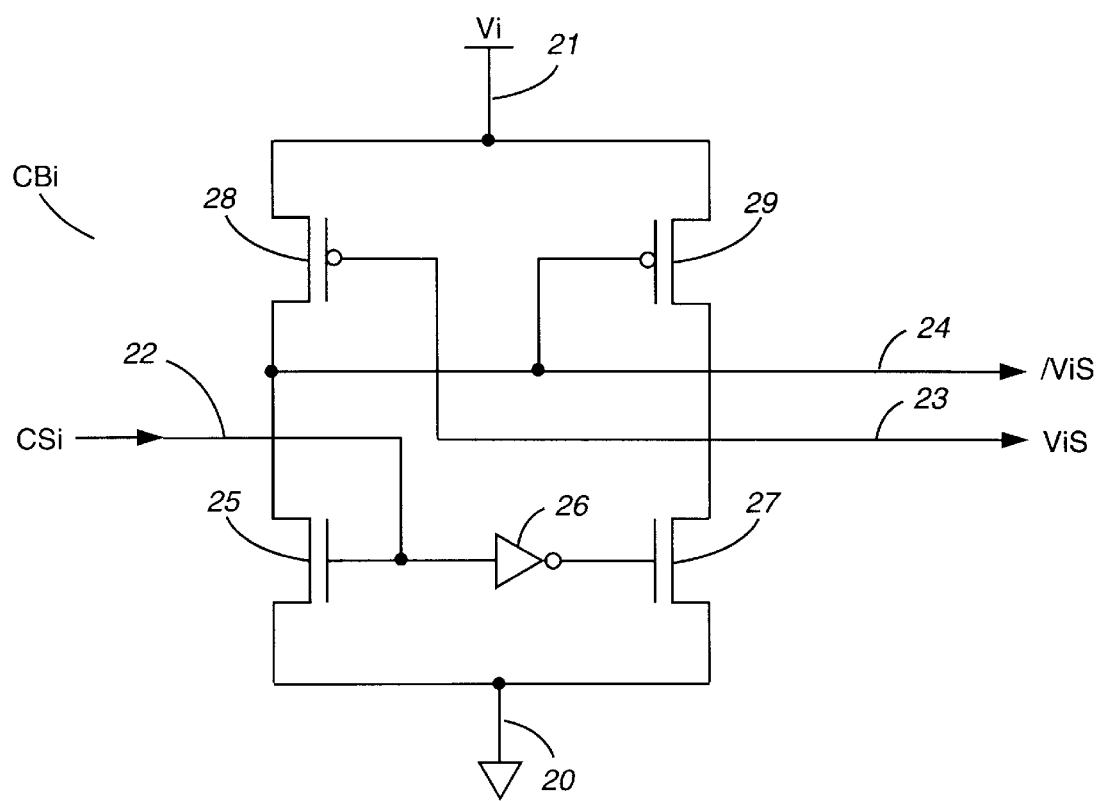
FIG. 8 shows a potential translator circuit used to produce control signals.

FIG. 8 illustrates an exemplary potential translator circuit CBi.

It comprises a supply input 20 to receive a reference potential (or ground), a supply input 21 to receive the voltage Vi produced by the cell Cn−i, a control input 22 to receive a selection control logic signal CSi, and two control outputs 23 and 24 to provide the switching control signals ViS and /ViS.

The input 22 is connected firstly to the control gate of an N channel MOS type transistor 25 and secondly to the input of an inverter 26. The output of the inverter 26 is connected to the control gate of an N channel MOS type transistor 27. The transistors 25 and 27 have their respective sources connected to the input 20. The drain of the transistor 25 is connected respectively to the drain of a P channel MOS type transistor 28, the output 24 and the control gate of a P channel MOS type transistor 29. The drain of the transistor 27 is connected respectively to the drain of the transistor 29, the output 23, and the control gate of the transistor 28. The transistors 28 and 29 have their respective sources connected to the input 21.

It is assumed that the selection control signal CSi is at 0 volts or at VCC and that the inverter 26 is supplied by the ground and VCC.

When the selection control signal CSi is at 0 volts, the transistor 25 is off and the transistor 27 is on. The switching control signal ViS is therefore at 0 volts and the transistor 28 is on. The switching control signal /ViS is therefore at the potential Vi and the transistor 29 is off.

When the selection control signal CSi is at VCC, the transistor 27 is off and the transistor 25 is on. The switching control signal /ViS is therefore at 0 volts and the transistor 29 is on. The switching control signal ViS is therefore at a potential Vi and the transistor 28 is off.

The potential translator circuit CBi provides for the conversion of a low voltage selection logic signal, at 0 volts or VCC, into a high voltage logic signal at 0 volts or Vi.

When the selection control signal CSi is in the low state (namely at 0 volts), the output 4 of the stage Cn−i is connected to the input 2 of the stage Cn−i+1 and is isolated from the output S.

Conversely, when the selection control signal CSI is in the high stage (namely at VCC), the output 4 of the stage Cn−i is connected to the output S and is isolated from the input 2 of the stage Cn−i+1.

Naturally, as many potential translator circuits will be used as there are stages with which there are associated selector switch circuits enabling them to be isolated from the previous stages. Thus, the example shown will use circuits CB1, CB2 and CB3 (not shown in FIG. 7), made in accordance with the above description, to produce the switching control signals (V1S, /VIS, V2S, /V2S, V3S, /V3S) used to isolate the stages Cn, Cn−1 and Cn−2 from the other stages or to connect them to these other stages.

Figure 9:
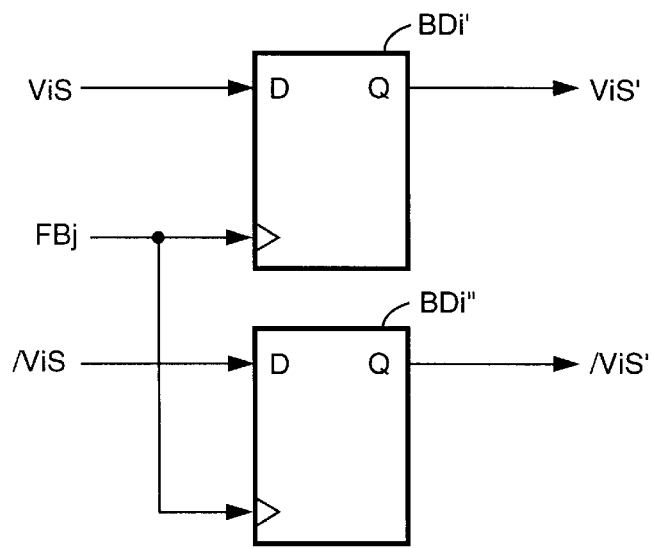
FIG. 9 shows a synchronization circuit.

It is possible furthermore to permit or not permit the isolation or addition of a stage Cn−i+1 as a function of the phases received by the previous stage Cn−i in order to avoid inducing disturbances in the transfer of charges (which is done in the stages when the phases are in the high state). One approach illustrated in FIG. 9 is that of planning to permit the isolation or addition of the stage Cn−i+1 if the phases received by the previous stage Cn−i are in the high state. In other words, the switching control signals are synchronized with the phases.

Switching control signals ViS' and /ViS' are produced by means of flip-flop circuits BDi' and BDi" receiving the switching control signals ViS and /ViS produced by the potential translator circuit CBi and the phase FBj at their control inputs (FBj being the phase FBN or FBX received by the stage Cn−i). The switching control signals ViS' and /ViS' will be used to drive the selection switch circuits instead of the switching control signals ViS and /ViS. Thus, the modification of the number of stages is done on the leading edge of the phase FBj.

The solution illustrated in FIG. 9 implies the availability of flip-flop circuits capable of receiving and giving high potentials. Naturally, it is possible to choose to take account of the control phases downline from the potential translator circuits. This also has the advantage of enabling the use of only one flip-flop circuit to take account of the phases. Indeed, it is then enough to synchronize the selection control signal CS1 alone instead of the two switching control signals ViS and /ViS. It is possible to provide this flip-flop circuit either with the signal FBj (if it is capable of taking a high potential at its control input) or a fraction of this potential (for example by means of a resistive bridge).

3—Regulation Circuit

Figure 10:
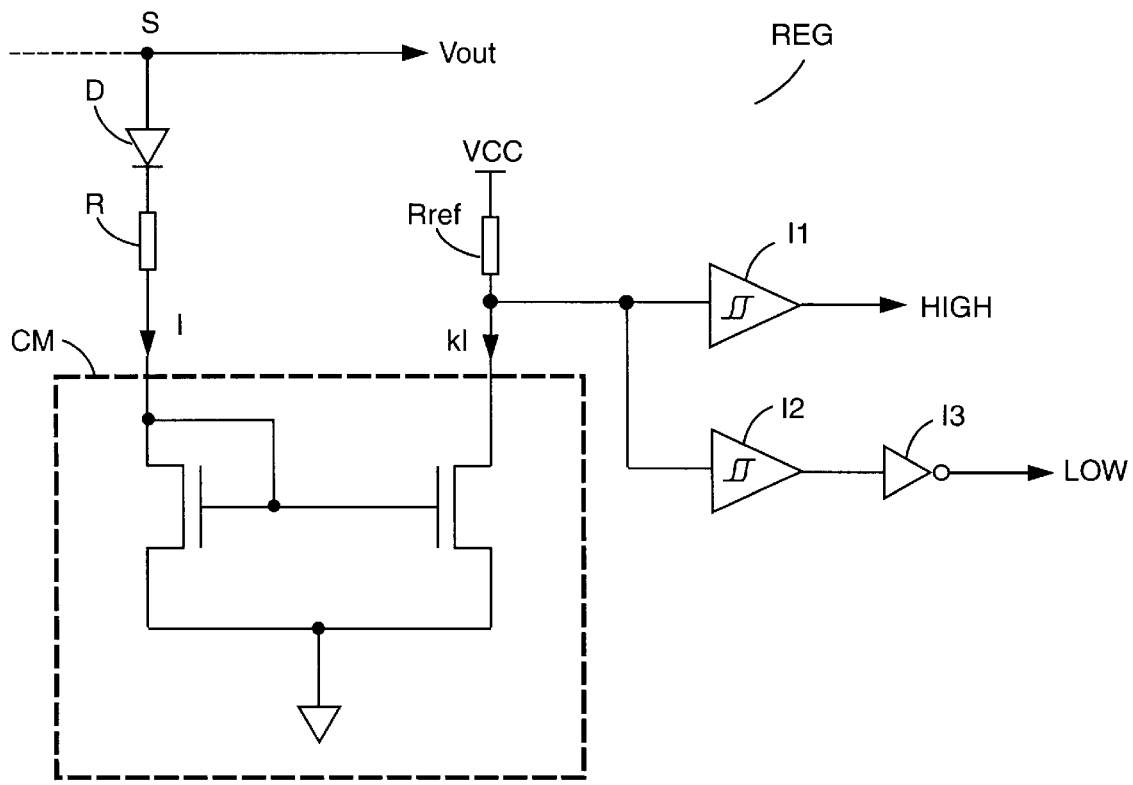
FIG. 10 shows a regulation circuit.

FIG. 10 illustrates a simplified embodiment of the regulation circuit REG.

The regulation circuit REG provides for the production of the incrementation control logic signal LOW (this signal controls the increase in the number of stages) and the decrementation control logic signal HIGH (this signal controls firstly the reduction of the number of stages and secondly the stopping or starting of the oscillator OSC).

The logic states of these decrementation and incrementation control logic signals are a function of the output voltage value Vout produced by the charge pump. The change in the states of these control signals takes place with reference to threshold values of the output voltage Vout.

The first threshold Vinc, called an incrementation threshold, is used to increase the number of stages of the charge pump.

A second threshold Vreg, called a regulation threshold, greater than the incrementation threshold, is used to drive the implementation or stopping of the production of the phases used by the stages.

A third threshold Vdec, called a decrementation threshold, greater than the regulation threshold, is used to diminish the number of stages of the charge pump.

Since the charge pump described produces a positive output voltage, the thresholds are obviously positive. For a charge pump producing a negative voltage, these thresholds will be negative and the relationships of superiority will be preserved in terms of absolute value.

The value of the output voltage Vout is compared with the different thresholds in the example shown by means of two hysteresis inverters I1 and I2 receiving an input voltage IN representing the value of the output voltage Vout.

To do this, a current I is tapped at the output S. This tapping will be done preferably in a highly resistive arm so as to minimize the value of the current tapped. Similarly, it is possible to fix a conduction threshold of the resistive arm, for example by means of one or more series-connected diodes in such a way that the arm is not conductive so long as the output voltage Vout has not reached the conduction threshold set by these diodes.

In the example shown, the resistive arm comprises a diode D and a resistor R that are series-connected, the anode of the diode being connected to the output S. The current I is amplified in a current mirror CM formed by two N channel MOS transistors providing a current k*I. The factor k is preferably greater than 1, making it possible to obtain a wide range of variation in the voltage IN from a small tapping of current at the output S.

The current k*I flows in a reference resistor Rref which acts as a current-controlled voltage source. This resistor Rref has a first pole that receives VCC and its second pole is connected to the ground by means of the copying transistor of the current mirror CM.

The second pole of the resistor Rref is connected to the input of the hysteresis inverters I1 and I2.

The hysteresis inverters I1 and I2 are designed to produce HIGH and LOW control signals, the states of these signals representing the value of the output voltage Vout.

The inverted I1 delivers the decrementation control signal HIGH. It is assumed that it has the decrementation threshold Vdec as the positive transition threshold and the regulation threshold Vreg as the negative transition threshold.

It will be assumed furthermore that the inverter I2 has the regulation threshold Vreg as the positive transition threshold and the incrementation threshold Vinc as the negative transition threshold. The output of the inverter I2 is connected to the input of an inverter I3 whose output delivers the incrementation control signal LOW.

A description shall now e given, with reference to the timing diagrams 11a to 11c, of the working of the regulation circuit REG.

The method implemented comprises the following steps:
  starting the charge pump, all the stages being series-connected, so that the maximum attainable value of output voltage produced is as high as possible given the number of stages of the circuit and of the supply voltage,
  reducing the number of stages of the circuit and/or stopping this circuit if the decrementation threshold is reached by the output voltage,
  restarting the circuit if the output voltage drops and reaches the regulation threshold, the number of stages being reduced and/or the circuit being stopped if the decrementation threshold is reached again,
  increasing the number of stages if, when the output voltage has dropped and reached the regulation threshold, it subsequently reaches the incrementation threshold.

Let it be assumed that the number of stages of the charge pump is the maximum and that the transfer of charges into these stages is initiated by placing the signal STOP in the low state. The output voltage Vout (shown in FIG. 11a) will gradually rise.

So long as the conduction threshold of the resistive arm is not reached, the current I is zero. The voltage IN is therefore equal to VCC. The control signals HIGH and LOW (illustrated in FIGS. 11b and 11c) are respectively in the low state and in the high state.

Then, the resistive arm becomes conductive. The current I increases as and when the output voltage Vout increases. The current k*I increases also. Consequently, the voltage IN gradually diminishes.

When the output voltage Vout reaches the incrementation threshold Vinc, the output of the inverter I2 remains in the low state. When the output voltage Vout reaches the regulation threshold Vreg, the output of the inverter I2 goes to the high state. Consequently, the control signal LOW goes to the low state.

Subsequently, when the output voltage Vout reaches the incrementation threshold Vdec, the control signal HIGH goes to the high state. The transfer of charges into the stages is then stopped. Simultaneously, as shall be seen here below, the number of stages connected to one another is diminished.

If, subsequently, the output voltage Vout drops and again reaches the regulation threshold Vreg, the output of the inverter I1 goes to the low state. This has the consequence of restarting the transfer of charges between the stages.

If, again, the decrementation threshold Vdec is reached (namely if the number of stages can be further be diminished to reach the output voltage Vout desired), then the control signal HIGH goes back to the high state, which has the effect of again stopping the transfer of charges and reducing the number of stages.

The number of series-connected stages will thus be gradually adapted to the value of the supply voltage VCC in order to minimize the output impedance of the charge pump.

If the voltage Vout drops and reaches the incrementation threshold Vinc, for example high consumption at output of the charge pump or a variation of the supply voltage, the output of the inverter I2 goes to the low state.

The incrementation control signal LOW will therefore go to the high state which, as shall be seen here below, leads to an increase in the number of stages of the charge pump (if the n stages are not already connected to one another, of course).

4.1—Control Circuit: Example 1

FIG. 12 illustrates a first exemplary embodiment of the control circuit CC.

It has three D type flip-flop circuits bearing references BD1, BD2 and BD3, series-connected and forming a shift register. The flip-flop circuits conventionally have a data input D, a data output Q, a control input H and a resetting input R. The outputs of the flip-flop circuits respectively give the selection control signals CS1, CS2 and CS3. Naturally, the number of flip-flop circuits will be adapted to the number of selection control signals to be produced.

The D input of the flip-flop circuit BD1 receives VCC. The D inputs of the flip-flop circuits BD2 and BD3 are connected respectively to the outputs of the flip-flop circuits BD1 and BD2 and therefore receive respectively the signals CS1 and CS2.

The H inputs of the Flip-Flop circuits receive an enabling signal UP and their resetting inputs receive a resetting signal RESET. It will be assumed that the enabling and resetting signals are active on a leading edge. In other words, when a leading edge appears on the enabling signal UP, the signal present at the data input of a flip-flop circuit is transferred to its output. Similarly, when a leading edge appears on the resetting signal RESET, the signals present on the Q outputs are put in the low state.

In a first example illustrated in FIG. 12, the number of stages is reduced, if necessary, in being disconnected one by one, by the shifting in the flip-flop circuits of a high logic state. If necessary, the number of stages is increased in reconnecting all the previously disconnected stages, by dictating low logic states at the output of the flip-flop circuits. To do this, it is possible to choose UP=HIGH and RESET=LOW (for the last signal, as shall be seen here below, it is possible to combine the signal LOW with another signal to ensure, when starting up, that the number of stages is the maximum).

Initially, when the charge pump is put into operation, the selection control signals CS1 to CS3 are in the low state. To be sure of this, it is possible to produce the resetting signal RESET by means of an OR type logic gate which receives firstly the signal LOW and secondly a signal produced by a monostable trigger circuit controlled by the signal STOP in such a way that a positive pulse is introduced when the charge pump is started. All the stages C1 to Cn are then series-connected. The decrementation control signal HIGH is in the low state.

As we have seen, the value of the output voltage Vout will gradually increase as and when the pumping takes place in the stages. If, given the value of the supply voltage VCC, the n stages provide for the supply of a voltage greater than the decrementation threshold Vdec, then the output voltage Vout will reach this threshold. The decrementation control signal HIGH then goes to the high state. The output Q of the first flip-flop circuit BD1 will then provide a selection control signal CS1 that is in the high state. The last stage Cn is therefore isolated from the other stages and, at the same time, the transfer of charges between the stages is topped.

If leakages take place at the output of the charge pump, or if there is consumption by the circuits supplied by this pump, the output voltage Vout will diminish. When it reaches the regulation threshold Vreg, the threshold of charges will start again and, at the same time, the decrementation control signal will go to the low state. If n*VCC>Vdec, then the decrementation control signal HIGH will go back to the high state. Consequently, the signal CS2 goes to the high state. Then the stage Cn−1 is isolated from the other stages. The charge pump then has n−2 stages series-connected between the input E and the output S. At the same time, the transfer of charge sin the stages is stopped.

If subsequently, the output voltage Vout diminishes (by consumption on the part of the circuits supplied by the charge pump or because of leakages), then just as above, the transfer of charges is started again.

If the output voltage Vout continues to drop (for example if the supply voltage VCC drops), it may happen that the transfer of charges does not enable it to be raised given the number of series-connected stages. If this is so, all the control signals CS1 to CS3 are put back in the low state as soon a the incrementation threshold Vinc is reached (inducing a leading edge in the incrementation control signal LOW applied to the resetting inputs). Then, there is a return to the initial stage in which the n stages are used; namely, a configuration such that the value attainable by the output voltage Vout is the maximum.

4.2—Control Circuit: Example 2

Figure 13:
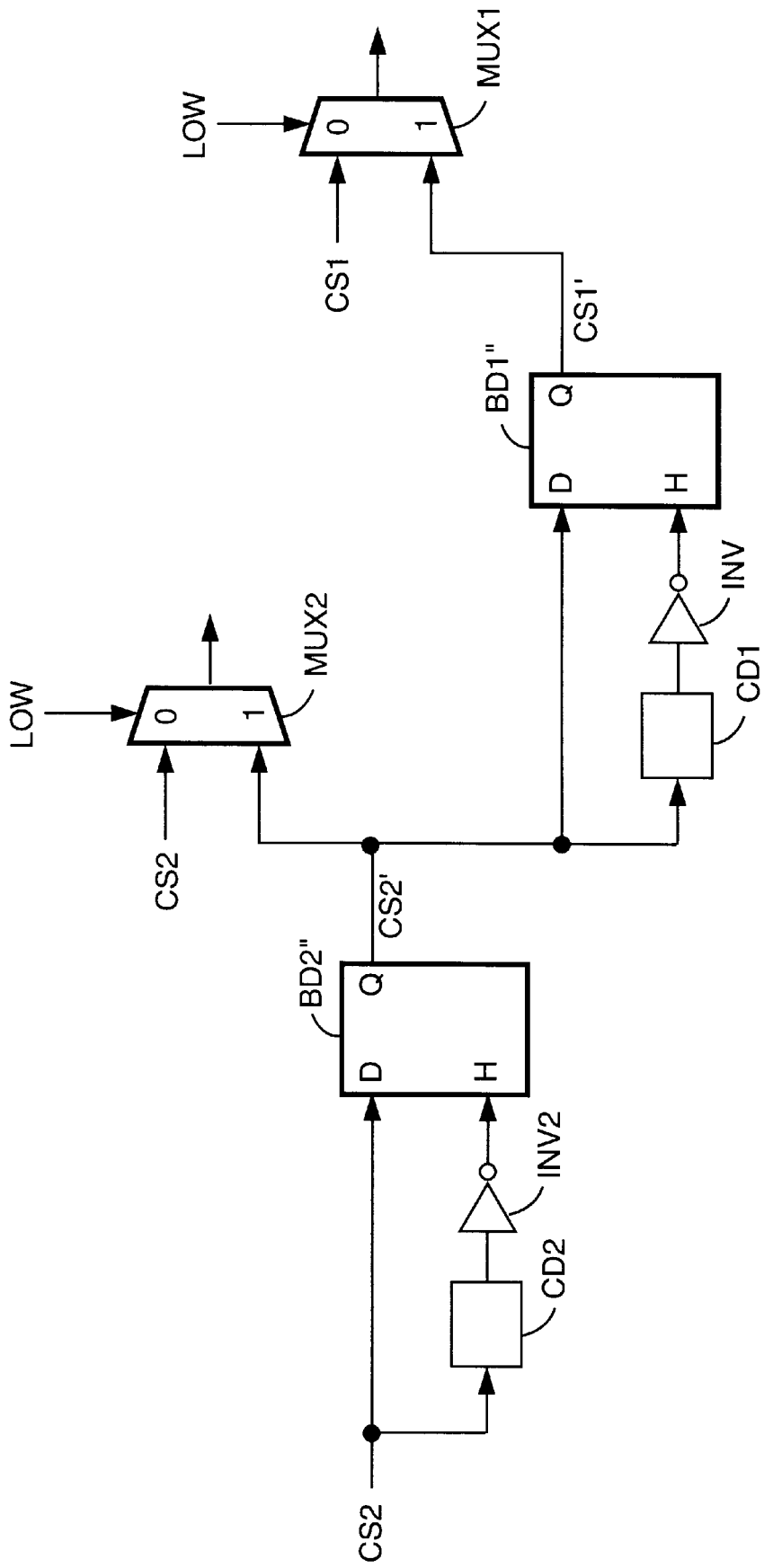
FIG. 13 shows a signal delay circuit.

FIG. 13 illustrates a variant of the circuit of FIG. 12 enabling the implementation of a gradual increase in the number of stages when the increase is done by groups of stages in delaying the action of the selection control signals with respect to one another for the stages of the groups, when the incrementation control signal LOW goes to the high state. This makes it possible to limit the risk of parasitic dysfunctioning that may be prompted by a simultaneous reconnection of all the stages of the charge pump that may have been previously disconnected.

In the drawing of FIG. 13, the selection control signals CS1 and CS2 are given to the inputs of two flip-flop circuits BD1" and BD2".

The increase in the number of stages is done logically in the reverse order to the reduction of this number. Thus, first of all the stage Cn−2, then the stage Cn−1 and then the stage Cn are reconnected by means of the selection control signals CS3, CS2 and CS1.

Since the selection control signal CS3 is the signal used to reconnect the first stage that can be reconnected, it is not necessary to modify its action by delaying it. On the contrary, the signal CS2 will be delayed with respect to the signal CS3 and the signal CS1 will be delayed with respect to the signal CS2.

Thus, the control input of the flip-flop circuit BD2" receives the selection control signal CS2 by means of a delay circuit CD2 and an inverter INV2. The delay circuit CD2 is constituted for example by two series-mounted inverters and a capacitor connected between the ground and the output (and the input respectively) of the first inverter (and the second inverter respectively). An output transition of the first inverter induces the charging and discharging of the capacitor, thus delaying the propagation of the transition towards the input of the second inverter. The fact of producing a delayed control signal provides for the stability of the state at the input of the flip-flop circuit before the appearance of an edge at the control input of this flip-flop circuit. The inverter is used to convert a trailing edge of the signal CS2 (following the leading edge of the control signal LOW) into a leading edge (it is assumed here that the control of the flip-flop circuit is done on a leading edge of the signal received at the control input).

CS2' denotes the signal produced by the flip-flop circuit BD2". The state of the signal is identical to that of the selection control signal CS2 with a certain delay.

The flip-flop circuit BD1" receives the selection control signal CS1 at its data input. It furthermore receives the signal CS2' at its control input by means of a delay circuit CD1 and an inverter INV1. The flip-flop circuit BD1" produces a signal CS1' identical to the selection control signal CS1 with a certain delay, this delay being greater than the delay dictated between the signals CS2 and CS2'. It will be noted that it is possible to isolate the flip-flop circuits BD1" and BD2" by sizing the delay circuits in such a way that the delay induced by the delay circuit CD1 is greater than the delay induced by the delay circuit CD2.

To obtain a gradual increase in the number of stages, it is enough to provide the signals CS1' and CS2' to the potential translator circuits that produce the switching control signals instead of the selection control signals CS1 and CS2. It is possible similarly to implement a gradual reduction of the number of stages while controlling several selector switch circuits with one and the same selection control signal.

In order that the reduction of the number of stages may remain identical to that of the arrangement illustrated in FIG. 12, it is possible to use multiplexers MUX1 (and MUX2 respectively) receiving the signals CS1 and CS1' (CS2 and CS2' respectively) and being controlled by the incrementation command signal LOW so as to provide the signals CS1 and CS2 if the signal LOW is the low state (which is the case when the number of stages is table or reduced) and receiving the signals CS1' and CS2' if the signal LOW is in the high state (in this case, with at least one leading edge having appeared in the signal LOW, the number of stages has increased). Thus, a delay is introduced into the control of the switching circuits not when the stages are to be disconnected but only when the previously disconnected stages are reconnected.

The examples of operation described here above are obviously not restrictive.

It is possible to choose to isolate more than one stage at a time, for example by using a flip-flop circuit to control several contiguous stages, in which case the control signals would be identical for these stages. It is possible to choose to control a number of stages that is variable as a function of the flip-flop circuits. This case is illustrated in FIG. 14.

4.3—Control Circuit: Example 3

Figure 14:
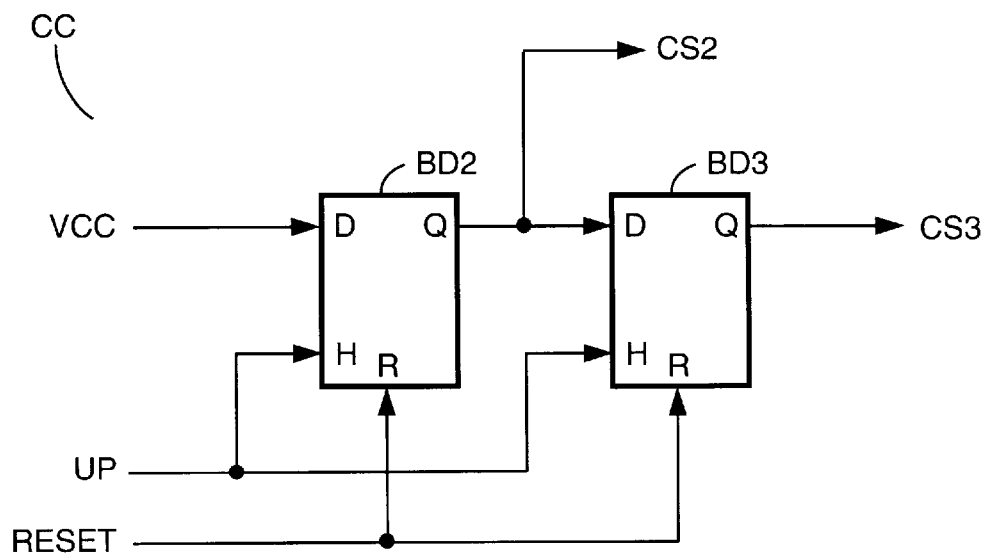
FIG. 14 shows a second exemplary control circuit.

In FIG. 14, unlike in FIG. 12, the flip-flop circuit BD1 is absent and the flip-flop circuit BD2 receives VCC at input. The flip-flop circuit BD2 gives the selection control signal CS2. The flip-flop circuit BD3 gives the selection control signal CS3. It is therefore possible to isolate one or two stages (Cn−2, or Cn−1 and Cn) simultaneously. It is possible, by choice, to remove the transistors SW1a and SW1b or to provide them with the signal CS2 (if it is desired to condition the modification of the number of stages as a function of the phases given to the previous stages as illustrated here above, with reference to FIG. 9). Similarly, by holding the selection switch circuits between the stages Cn−1 and Cn, it is possible to delay the action of the signal CS2 depending on whether it is used to act on these selection switch circuits or on those present between the stages Cn−1 and Cn−2. With regard to the enabling and resetting signals, they will be produced similarly to what has been described with reference to FIG. 12.

4.4—Control Circuit: Example 4

Figure 15:
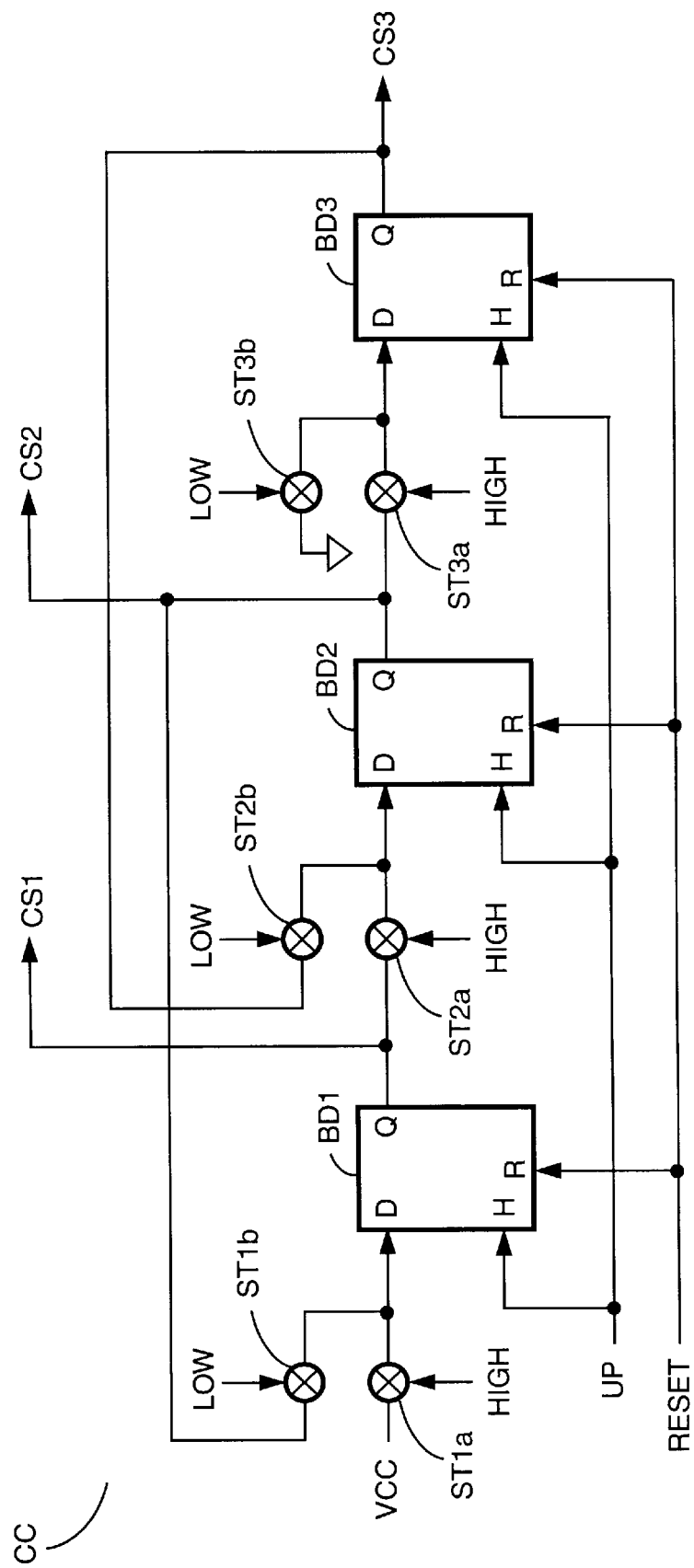
FIG. 15 shows a third exemplary control circuit.

FIG. 15 illustrates another exemplary embodiment of the control circuit CC in which the number of stages will be increased or reduced stage by stage.

In the example shown in FIG. 15, switching means are used to connect the D inputs of the flip-flop circuits BD1, BD2 and BD3, either to the output of the previous flip-flop circuit or to the output of the next flip-flop circuit.

The D input of the first flip-flop circuit BD1 may either be connected to the output of the flip-flop circuit BD2 or receive VCC. The D input of the last flip-flop circuit BD3 may be either connected to the output of the flip-flop circuit BD2 or connected to the ground.

The selection of the signals given to the D inputs of the flip-flop circuits is done for example by means of transistor-based switches (ST1a and ST1b for the flip-flop circuit BD1, ST2a and ST2b for the flip-flop circuit BD2, ST3a and ST3b for the flip-flop circuit BD3).

The switches ST1a, ST2a and ST3a which make it possible to connect the inputs of the flip-flop circuits to the outputs of the previous flip-flop circuits (or to VCC for the first flip-flop circuit), are controlled by the decrementation control signal HIGH so that the switches are closed when the signal HIGH is in the high state and are open otherwise.

The switches ST1b, ST2b and ST3b which make it possible to connect the inputs of the flip-flop circuits to the outputs of the following flip-flop circuits (or to the ground for the first flip-flop circuit) are controlled by the incrementation control signal LOW so that these switches are closed when the signal LOW is in the high state and are open otherwise.

The production of the enabling signal UP is modified with respect to the examples illustrated in FIGS. 12 and 14. Indeed, the flip-flop circuits form a shift register used to shift a high logic state in one direction on a leading edge in the control signal HIGH (in a manner similar to the examples shown in FIGS. 12 and 14) and to shift a low logic state in the other direction on a leading edge in the control signal LOW (unlike in the previous examples).

Figure 16:
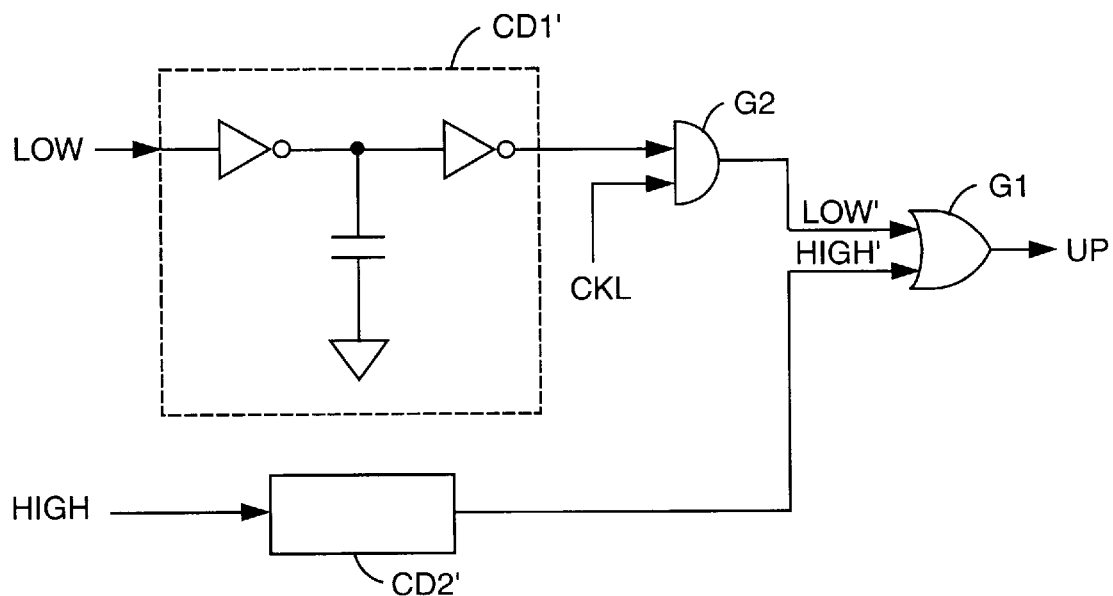
FIG. 16 shows a circuit by which it is possible to produce the signals used in the circuit illustrated in FIG. 15.

FIG. 16 illustrates a circuit used to produce the enabling signal UP. It has two delay circuits CD1' and CD2' used to produce two signals LOW' and HIGH' from the control signals LOW and HIGH. The signals LOW' and HIGH' are identical to the control signals LOW and HIGH, delayed with a certain delay. The delay circuits CD1' and CD2' are constituted for example by two series-connected inverters and a capacitor connected between the ground and the output (and the input respectively) of the first inverter (and second inverter respectively). A transition at the output of the first inverter induces the charging or discharging of the capacitor, thus delaying the propagation of the transition towards the input of the second inverter. The fact of producing delayed control signals makes it possible to ensure the stability of the states at the date input of the flip-flop circuits before the appearance of an edge of the enabling signal UP on the control inputs of these flip-flop circuits.

The enabling signal UP is produced by a two-input OR type logic gate G1. The gate G1 receives the signal HIGH' and a signal LOW" at its inputs. The signal LOW" is produced by an AND type two-input logic gate G2. At its inputs, the gate G2 receives the signal LOW' and a clock signal CKL. This gate G2 provides for the production of the edges if the signal LOW' is blocked in the low state.

The resetting signal RESET is no longer used to increase the number of stages. It will be used solely to reset all the flip-flop circuits when the charge pump is stated so as to ensure that a maximum number of stages is then available.

With respect to the operation of the control circuit illustrated in FIG. 15, it will be essentially identical to the cases described here above with respect to the reduction in the number of stages. Indeed, at each appearance of a leading edge in the decrementation control signal HIGH, a high logic state will be shifted in the flip-flop circuits. The only difference with the cases described here above is the presence of a small delay between the time when the edge appears and the time when the high state is given to the input of the flip-flop circuit. This makes it possible to ensure the stability of the states given to the flip-flop circuits by means of the switches ST1a, ST2a and ST3a.

For the reconnection of the stages, on the contrary, the operation is different.

Let it be assumed that the incrementation threshold Vinc is attained by the output voltage Vout which is in the process of diminishing. The incrementation control signal LOW goes to the high state. The first flip-flop circuit which has a low state at the output will then given this state at the input of the previous flip-flop circuit. Then, a stage will be added in a series connection with the other stages (if this is possible). It may happen that this is not sufficient to make the output voltage Vout rise. This output voltage then remains below the incrementation threshold Vinc. It is then necessary, when possible, to add one or more other stages to try and raise the value of the output voltage Vout. Now, the fact that there is no new edge in the control signal LOW (and this is the case so long as the voltage Vout has not again reached the regulation threshold Vref) means that it is not possible to control any addition of the stages.

A first approach is to provide for example for a fourth threshold Vthreshold below the incrementation threshold Vinc, which produces the same effect as the incrementation control signal LOW as used in the examples illustrated in FIGS. 12 and 14, i.e it gives rise to the production of an edge in the resetting signal RESET given to the flip-flop circuits. When the threshold Vthreshold is reached, then the end stages are series-connected together and the number of stages is the maximum.

FIG. 16 illustrates a second approach.

If the signal LOW' remains permanently in the high state, the signal LOW' will follow the variations of the signal CKL. Thus, active edges are produced in the signal UP when the signal LOW is held in a permanent high state (the switches ST1b, ST2b and ST3b are then closed) leading to a gradual increase in the number of stages connected to one another. It is possible for example to use one of the phases FX or FN as a signal CKL.

This second approach has the drawback of having a reaction time that may be slower (unless only the last stage is isolated) than the approach in which a fourth threshold is used. By contrast, it makes it possible to connect only the requisite number of stages to the other stages. This is advantageous as regards the impedance of the charge pump. Furthermore, if no delay device as illustrated in FIG. 13 is used, fewer parasites are induced than is the case when all the stages are induced than is the case when all the stages are reconnected simultaneously. Finally, the absence of the use of a fourth threshold makes it possible to limit the size and the consumption of the regulation circuit.

In the example illustrated by the circuit of FIG. 15, when one or more stages have to be reconnected, the first flip-flop circuit having a low logic state at the output makes it possible, on a leading edge of the enabling signal UP, to modify the state of the signal at the output of the flip-flop circuit that precedes it. This flip-flop circuit then goes from the high state to the low state.

The last flip-flop circuit BD3 receives the low state at input by means of the switch ST3b in such a way that it is possible to initiate the reconnection of the stages if all the stages that can be isolated have been isolated (the output signals of the flip-flop circuits are indeed, if this is the case, all in the high state).

4.5—Control Circuit: Example 5

It will be noted that it is very well possible to reconnect the stages at higher speed than they are disconnected, without in any way thereby implying that they will all be reconnected when an edge appears in the incrementation control signal LOW.

Figure 17:
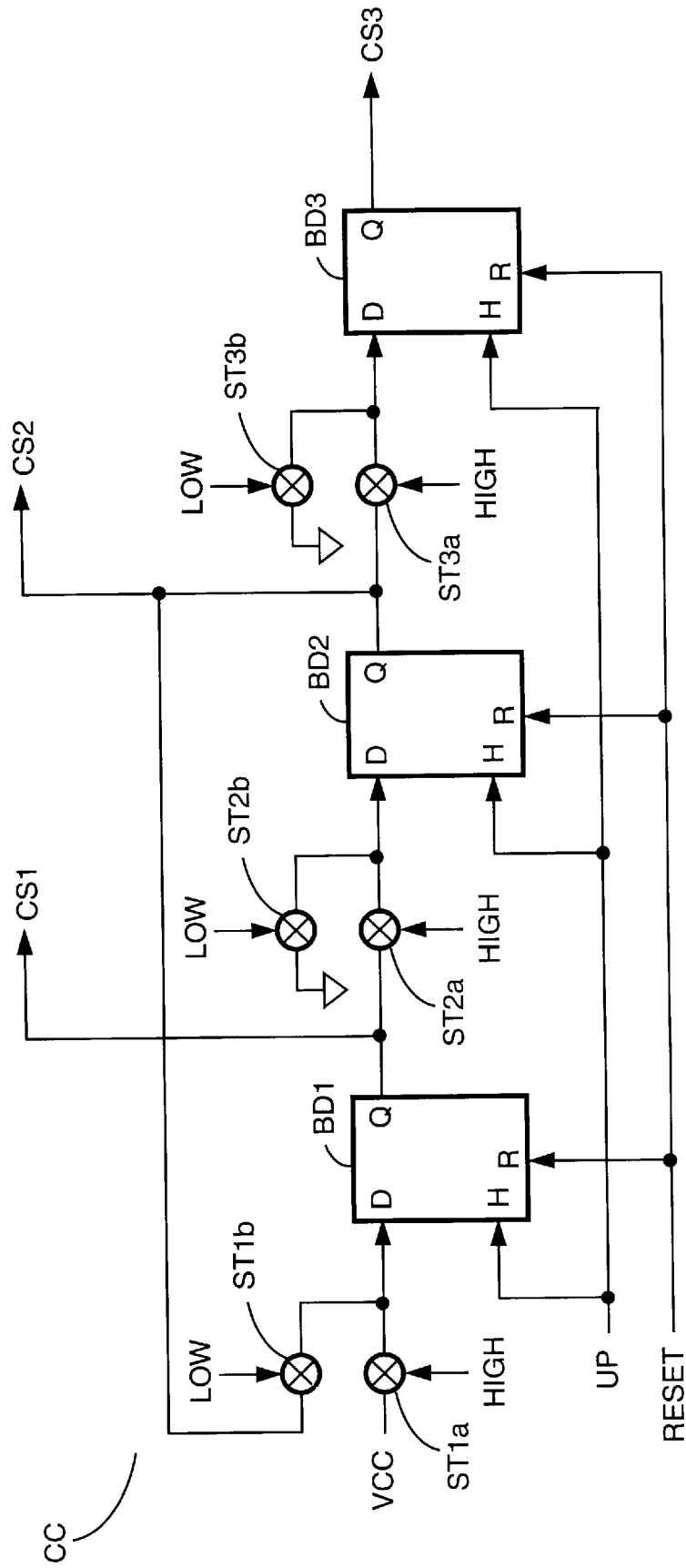
FIG. 17 shows a fourth exemplary control circuit.

This signal is illustrated in FIG. 17.

The switch ST2b is used in this case to connect the D input of the flip-flop circuit BD2 to the ground. Thus, the stages Cn and Cn−1 are connected simultaneously from a single control edge of the enabling signal UP. It is possible if necessary to introduce a certain delay into the modification of the states of the control signals given to the selection switch circuits. To do this, it is enough to produce delayed signals as shown for example in FIG. 13.

The increase in the number of stages by the reconnection of several stages through a single edge in the enabling signal UP provides for an improvement in the reaction time of the charge pump with respect to the example shown in FIG. 15 while minimizing the connection and disconnection cycles.

Indeed, in the case of a drop in the output voltage Vout, the methodical reconnection of all n stages is not absolutely necessary. If it is done methodically, it may become necessary to immediately disconnect the stages that have just been reconnected. The choice between the reconnection of all the stages together or the gradual increase in the number of stages will depend on the priority chosen, namely the reaction time of the pump to provide, once again, the output voltage desired or the variation in output impedance or the variation in the consumption of the charge pump.

The invention cannot be limited to the particular cases illustrated here above. It will be understood that it is quite possible to combine the examples illustrated here above, for example by disconnecting the stages in groups of variable sizes and by reconnecting them in groups of different sizes.

Furthermore, it is possible to isolate the output of the last stage Cn from the output S by a P channel MOS type transistor controlled by the signal V1S so as to completely isolate the output S from the unused stages.

It is also possible to completely isolate the stages from one another by providing for isolation transistors between the outputs 5 and the inputs 3 of the stages.

It is also possible, without going beyond the scope of the invention, to modify the polarity of the control signals as illustrated, or again to use other circuits to produce these signals.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A voltage booster circuit comprising:
    an input for receiving a supply voltage;
    an output for providing an output voltage such that the value of the output voltage is greater than the value of the supply voltage;
    a plurality of stages coupled in series;
    connection means for connecting a selected number of stages, operatively coupled together, to the output of the voltage booster circuit; and
    regulating means for sensing the value of the output voltage, and for determining the number of stages to be connected to the output to provide a specified output voltage value.

2. The circuit of claim 1, wherein the connection means comprises at least one selection switch for the selective connection of at least one output of a stage to an input of another stage or to the output of the booster circuit.

3. The circuit of claim 2, wherein the regulating means comprises:
    a regulation circuit; and
    a control circuit, for receiving the at least one control signal and comprising means for producing, responsive to the at least one control signal, at least one selection control signal to control the selection switch;
    and wherein the regulation circuit comprises:
    means for performing a comparison of the value of the output voltage to at least one threshold; and
    means for producing at least one control signal having a level whose value depends on the result of the comparison.

4. The circuit of claim 3, wherein:
    the means for performing a comparison of the value of the output voltage to at least one threshold comprises means for performing a comparison of the value of the output voltage to an incrementation threshold, a decrementation threshold, and a regulation threshold;
    the selection switch utilizes the at least one selection control signal so as to reduce the number of stages when the decrementation threshold is reached and to increase the number of stages when the incrementation threshold is reached; and
    the means for producing at least one control signal comprises means for producing a first control signal representing the result of the comparison of the output voltage with the at least one threshold, wherein the first control signal is utilized to control the transfer of charges between the stages.

5. The circuit of claim 4, wherein:
    the means for producing at least one control signal further comprises means for producing a second control signal; and
    the regulation circuit further comprises:
    a first comparator to produce the first control signal in such a way that the first control signal changes its logic state when the decrementation threshold is reached and when the regulation threshold is reached; and
    a second comparator to produce the second control signal in such a way that the second control signal changes logic state when the incrementation threshold is reached and when the regulation threshold is reached.

6. The circuit of claim 5, wherein the means for producing at least one selection control signal comprises at least one flip-flop circuit producing, at outputs, the selection control signals as a function of the control signals produced by the regulation circuit.

7. The circuit of claim 6, wherein;
    the at least one flip-flop circuit comprises a plurality of flip-flop circuits forming a shift register; and
    the control circuit comprises a second selection switch circuit for the selective connection of the inputs of the flip-flop circuits to outputs or inputs of other flip-flop circuits.

8. The circuit of claim 7, wherein the second selective switch circuit comprises means for shifting a first logic state in one direction through the shift register to increase the number of stages and shifting a second logic state in the reverse direction through the shift register to reduce the number of stages.

9. The circuit of claim 8, wherein the circuit means for producing the at least one selection control signal simultaneously modifies the states of different selection control signals.

10. The circuit of claim 9, wherein the means for producing the at least one selection control signal comprises at least one flip-flip circuit producing a selection control signal to control several selection switch.

11. The circuit of claim 10, comprising delaying means to delay the selection control signals so as to gradually increase or reduce the number of stages connected when several selection switch circuits are controlled with a single flip-flop circuit.

12. The circuit of claim 11, further comprising potential translator circuits controlled by the selection control signals to control the selection switch circuit.

13. The circuit of claim 7, wherein the second selective switch circuit comprises means for shifting a first logic state in one direction through the shift register to increase the number of stages and simultaneously producing selection control signals, at the outputs of the flip-flop circuits, in a second logic state to reduce the number of stages.

14. The circuit of claim 7, wherein the control circuit comprises at least one flip-flop circuit producing a selection control signal to control several selection switch circuits.

15. The circuit of claim 7, wherein flip-flop circuits are organized so as to simultaneously modify the states of different selection control signals.

16. The circuit of claim 3, further comprising means to synchronize the control signals of each selection switch circuit with synchronization signals received by the stages to drive the transfer of charges between the stages.

17. The circuit of claim 3, further comprising potential translator circuits controlled by the selection control signals to control the selection switch circuit.

18. The circuit of claim 3, wherein the control circuit has one or more flip-flop circuits producing, at outputs, the selection control signals as a function of the control signals produced by the regulation circuit.

19. The circuit of claim 3, wherein:
    the at least one threshold further comprises a regulation threshold; and
    the at least one control signal comprises a first control signal representing the result of the comparison of the output voltage with the at least one threshold, the first control signal being utilized to control the transfer of charges between the stages.

20. A method for producing an output voltage from a supply voltage by using a voltage booster circuit, the circuit comprising an input for receiving the supply voltage, a plurality of stages, and selection switch for the selective isolation of the stages or for the selective connection of the stages, the method comprising the following steps:

starting the circuit;

comparing the value of the output voltage with a decrementation threshold;

decreasing the number of stages which are connected if the decrementation threshold is reached by the value of the output voltage;

comparing the value of the output voltage with an incrementation threshold; and increasing the number of stages which are connected if the incrementation threshold is reached by the value of the output voltage.

21. The method of claim 20, further comprising the steps of:

stopping the circuit if a stopping threshold is reached by the output voltage; and restarting the circuit if the circuit is stopped and a restarting threshold is reached by the output voltage.

22. The method of claim 21, wherein the step of starting the circuit comprises all the stages being connected, so that the maximum attainable value of the output voltage is as great as possible, given the number of stages of the circuit and the supply voltage.

23. The method of claim 22, wherein the step of increasing the number of stages comprises increasing in groups of stages, wherein the group comprises more than one stage but less than the maximum number of stages, and wherein a delay is introduced between the groups so that the increase is gradual.

24. The method of claim 23, wherein the step of increasing the number of stages further comprises reconnecting all of the stages at the same time if the output voltage reaches a minimum threshold which is below the incrementation threshold.

25. A charge pump-type of voltage booster circuit comprising of a number of series-connected stages for the production, by transfer of charges between the stages, of an output voltage from a supply voltage from a supply voltage, said booster circuit further comprising:

means for reducing or increasing the number of stages connected as a function of the value of the voltage produced, so that the number of stages connected is adapted to the number of stages necessary to attain a specified output voltage value, given the value of the supply voltage;

selection switch for the selective connection of at least one output of a stage to an output of another stage or to an output of the circuit;

a regulation circuit comprising means for comparing the value of the output voltage produced with an incrementation threshold and a decrementation threshold and, means for comparing the value of the output produced with a regulation voltage to compare the value of the output voltage produced with a regulation threshold disposed between the incrementation and the decrementation thresholds and to produce a first control signal representing the result of the comparison, this first control signal being given to an oscillator of the circuit to control or to stop the transfer of charges between the stages, and a control circuit for the production, from control signals received from the regulation circuit, of the selection control signals to control the selection switch, said control circuit being organized so as to reduce the number of stages when the decrementation threshold is reached and to increase the number of stages when the incrementation threshold is reached.

26. The circuit according to claim 25, wherein the regulation circuit includes a first hysteresis comparator to produce the first control signal in such a way that it goes into a first logic state when the decrementation threshold is reached and into a second logic state when the regulation threshold is reached.

27. The circuit according to claim 25, wherein the regulation circuit has a second hysteresis comparator to produce a second control signal in such a way that it goes into a first logic state when the incrementation threshold is reached and goes into a second logic state when the regulation threshold is reached.

28. The circuit according to claim 27, wherein the control circuit has one or more flip-flop circuits producing, at outputs, the selection controls, as a function of the control signals.

29. The circuit according to claim 28, wherein the control circuit comprises a plurality flip-flop circuits forming a shift register.

30. The circuit according to claim 29, wherein the control circuit comprises selection switch means for the selective connection of the inputs of flip-flop circuits to outputs or inputs of other flip-flop circuits.

31. The circuit according to claim 30, wherein the flip-flop circuits are organized so as to form a shift register in which a first logic state is shifted in one direction to increase the number of stages and in which a second logic state is shifted in the reverse direction to reduce the number of stages.

32. The circuit according to claim 31, wherein flip-flop circuits are organized so as to simultaneously modify the states of different selection control signals.

33. The circuit according to claim 32, wherein the flip-flop circuits are organized so as to form a shift register in which a first logic state is shifted in one direction to increase the number of stages and in which the outputs of the flip-flop circuits simultaneously produce selection control signals in a second logic state to reduce the number of states.

34. The circuit according to one of the claim 33, wherein the control circuit comprises at least one flip-flop circuit producing a selection control signal to control several selection switch means.

35. The circuit according to claim 34, comprising delaying means to delay the selection control signals so as to gradually increase or reduce the number of stages connected when several selection which means are controlled with a signal flip-flop circuit.

36. The circuit according to claim 25, comprising potential translator circuits controlled by the selection control signals to control the selection switch.

37. The circuit according to claim 25, further comprising means for synchronizing the control signals of the selection switch with synchronization signals received by the stages to drive the transfer of charges between the stages.

38. A method for the production of an output voltage from a supply voltage by using a voltage booster circuit of the charge pump type, this circuit comprising series-connected stages and comprising selection switch for the selective connection, to other stages, of some of the states of this circuit, said method comprising:

starting of the circuit, all the stages being series-connected, so that the maximum attainable value of the voltage produced is as great as possible, given the number of stages of the circuit and the supply voltage;

diminishing of the number of stages of the circuit and/or the stopping of this circuit if a decrementation threshold is reached by the output voltage;

re-starting of the circuit if the output voltage drops and reaches a regulation threshold below the decrementation threshold, the number of stages being diminished and/or the circuit being stopped if the decrementation threshold is again reached, and increasing of the number of stages if, when the output voltage has dropped and reached the regulation threshold, if subsequently reaches an incrementation threshold below the regulation threshold.

39. The method according to claim 38, wherein the increase in the number of stages is obtained in groups of stages and a delay is introduced between the stages of the groups so that the increase is gradual.

40. The method according to one of the claim 38, wherein the circuit is organized so that the increase in the number of stages is such, when the incrementation threshold is reached, that the number of stages is smaller than the maximum number of stages, wherein all the stages are reconnected in series if the output voltage reaches a fourth threshold which is below the incrementation threshold.

\* \* \* \* \*